United States Patent
Kokuryo et al.

[11] Patent Number: 5,943,374
[45] Date of Patent: Aug. 24, 1999

[54] OUT-OF-SYNCHRONIZATION RECOVERY METHOD AND APPARATUS OF DATA TRANSMISSION SYSTEM

[75] Inventors: Yoshiro Kokuryo, Tachikawa; Takao Koyama; Yoshio Iwasaki, both of Kodaira, all of Japan

[73] Assignee: Hitachi Denshi Kabushiki Kaisha, Tokyo, Japan

[21] Appl. No.: 08/763,324

[22] Filed: Dec. 10, 1996

[30] Foreign Application Priority Data

Dec. 11, 1995 [JP] Japan ................................. 7-321561

[51] Int. Cl.⁶ ............................................. H04L 7/00
[52] U.S. Cl. ......................................... 375/354; 375/368
[58] Field of Search ............................. 375/354, 360, 375/368; 370/514

[56] References Cited

U.S. PATENT DOCUMENTS

| | | | |
|---|---|---|---|
| 5,267,036 | 11/1993 | Habraken et al. | 358/133 |
| 5,376,969 | 12/1994 | Zdepski | 348/466 |
| 5,568,199 | 10/1996 | Kajimoto et al. | 348/390 |
| 5,572,247 | 11/1996 | Montgomery et al. | 348/10 |
| 5,585,858 | 12/1996 | Harper et al. | 348/485 |
| 5,608,656 | 3/1997 | Durcell et al. | 364/514 R |
| 5,625,651 | 4/1997 | Cioffi | 375/354 |
| 5,651,033 | 7/1997 | Gregg et al. | 375/354 |
| 5,666,366 | 9/1997 | Malek et al. | 370/505 |
| 5,687,199 | 11/1997 | Dupuy | 375/354 |

FOREIGN PATENT DOCUMENTS

| | | |
|---|---|---|
| 0651584 | 5/1995 | European Pat. Off. |
| 9400952 | 1/1994 | WIPO |

*Primary Examiner*—Stephen Chin
*Assistant Examiner*—Mohammad Ghayour
*Attorney, Agent, or Firm*—Antonelli, Terry, Stout & Kraus, LLP

[57] ABSTRACT

A transmission data sequence including a plurality of continuous data portions each formed on a byte unit basis and including predetermined code data is transmitted from a transmission station to a receiving station as serial data. At the receiving station, the transmission data sequence is received and converted to parallel data, and the parallel data is processed byte by byte. At the transmission station, out-of-synchronization detection code data sequence derived by shifting the first predetermined code data by from one bit to a predetermined number of bits at one bit pitch is inserted into the transmission data sequence and it is transmitted. At the receiving station, when a part of the out-of-synchronization detection code data sequence in the transmission data sequence is detected during processing on a byte unit basis of the transmission data sequence received and converted to the parallel data, it is determined that the processing on a byte unit basis of the transmission data sequence is in the out-of-synchronization state between the transmission station and the receiving station and an operation to recover the processing on a byte unit basis of the transmission data sequence to a synchronization state is conducted.

23 Claims, 8 Drawing Sheets

FIG. 10(a) SYNCHRONIZATION CLOCK ON A BYTE UNIT BASIS

FIG. 10(b) INPUT DATA

FIG. 10(c) OUTPUT OF S/P CONVERTER AT BYTE SYNCHRONIZATION MODE

FIG. 10(d) SYNCHRONIZATION CLOCK ON A BIT UNIT BASIS

FIG. 10(e) INPUT DATA

FIG. 10(f) OUTPUT OF S/P CONVERTER AT BIT SYNCHRONIZATION MODE

FIG.11

OUT-OF-SYNCHRONIZATION RECOVERY METHOD AND APPARATUS OF DATA TRANSMISSION SYSTEM

BACKGROUND OF THE INVENTION

The present invention relates to the recovery of out-of-synchronization of a transmission data sequence in data transmission system and method for transmitting the transmission data sequence comprising a plurality of continuous data portions each formed on a byte unit basis as serial data from a transmission station to a receiving station, receiving the transmission data sequence at the receiving station for converting it to parallel data and processing it byte by byte, and more particularly to the recovery of out-of-synchronization which occurs in the transmission of image compressed data in an image compression technology conforming to the JPEG (Joint Photograph Expert Group: ISO/IEC DIS 10918-1, ISO/IEC CD 10918-2) Standard or the like.

As references relating to the JPEG Standard, (1) "International Standard Coding Scheme of Color Still Image—JPEG Algorithm" INTERFACE, December 1991, CQ Publishing Co., pp. 160–183, (2) "Image Processing Technique in Multimedia Age—Manufacture of JPEG Image Compression/Decompression Extension Card for PC98", TRANSISTOR TECHNOLOGY, September 1994, CQ Publishing Co., pp. 281–295, and (3) "Newest MPEG Text", ASCII Publishing Co., Aug. 1, 1994, pp. 53–67 have been known.

Compressed data, for example, compressed data conforming to the JPEG Standard basically comprises two types of codes, that is, compressed image data and a control code called a marker.

Figure 1:
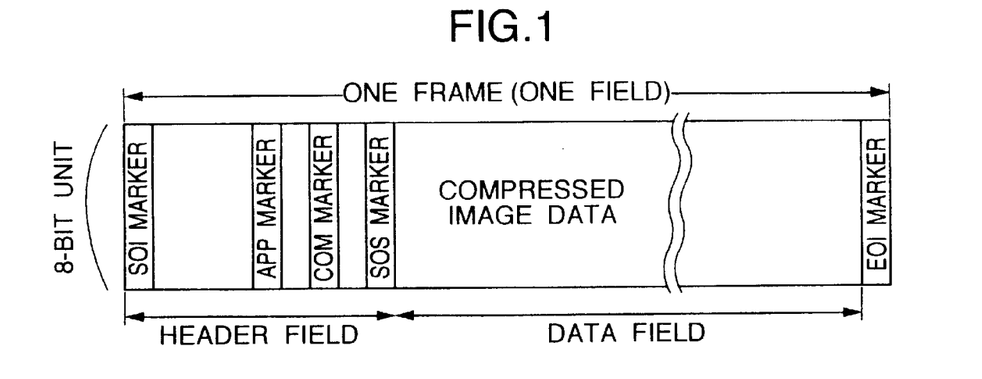
FIG. 1 shows a structure of one frame or field defined by the JPEG Standard.

A structure of one frame of or one field of transmission data sequence defined by the JPEG Standard is shown in FIG. 1. An internal structure of the transmission data sequence is divided into a header field and a data field each formed on a byte unit basis. The data field includes compressed image data and the header field comprises various types of markers. One frame of or one field of data begins with a marker called an SOI (Start of Image) and ends at an EOI (End of Image) marker.

When a large volume of frame data or field data of such structure is to be transmitted, the data portions blanketed by the SOI marker and the EOI marker are serially transmitted.

Figure 2:
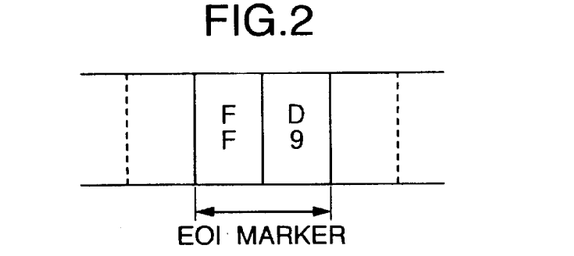
FIG. 2 shows a structure of an EOI marker defined by the JPEG Standard.

As shown in FIG. 2, the EOI marker includes two bytes, FFh and D9h, where h represents hexadecimal rotation. This marker indicates the end of one frame of or one field of image data and it should be always added. The end of one frame of or one field of image data is identified by receiving the EOI marker by a decompressor at the receiving station.

Figure 3:
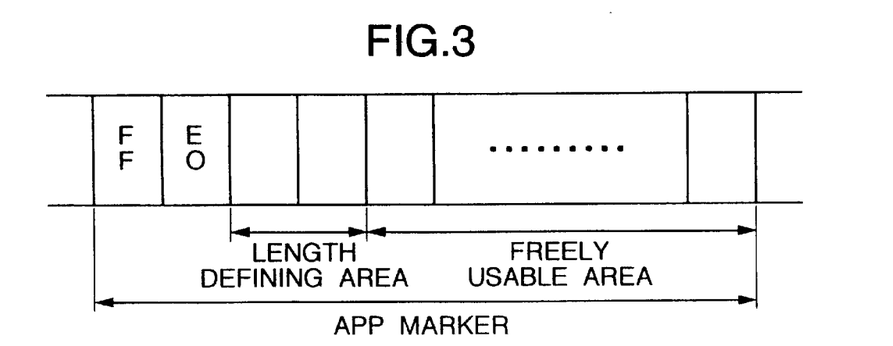
FIG. 3 shows a structure of an APP marker defined by the JPEG Standard.

An APP (Reserved for Application Use) marker shown in FIG. 3 includes a start code consisting of FFh and E0h, two-byte data representing a length of the entire APP marker and a subsequent area into which a user may freely enter data (that is, an area available to the user for entering any data).

Figure 4:
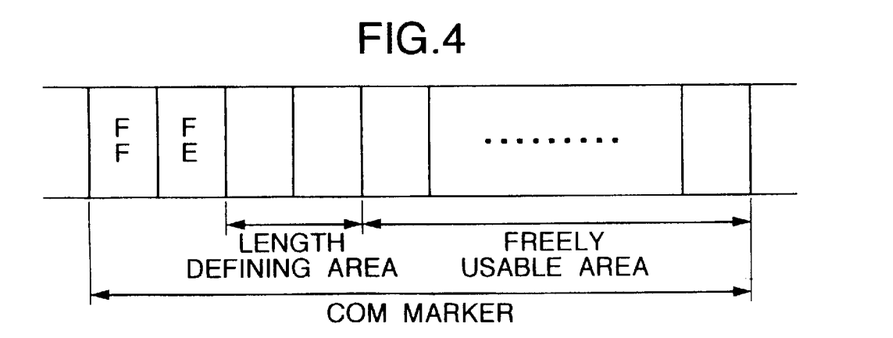
FIG. 4 shows a structure of a COM marker defined by the JPEG standard.

Similarly, a COM (Comment) marker shown in FIG. 4 includes a start code consisting of FFh and FEh, two-byte data representing a length of the entire COM marker and a subsequent area which the user may freely use.

The markers are classified to essential markers (for example, SOI marker and EOI marker) and markers marketers which are added as required (for example, COM marker and APP marker). Those are defined in the JPEG Standard.

After an image of one picture on a screen is divided into small blocks each formed by 8×8 pixels, for example, and the internal data of the blocks is compressed for each block, the image data is coded to a variable length code by the Huffman coding, and the image data basically formed by data on a byte unit basis. The marker is formed by data on a one or two bytes unit basis and formed by a code starting with FFh (representing FF of the hexadecimal code) as described above.

However, some image compressed data may include FFh. Accordingly, in order to discriminate the marker from the compressed data, if the code FFh appears, a code 00h is inserted to the compressed data without regard to the next image compressed data. On the other hand, as for the marker, it is ruled that a code following to FFh is set to other than 00h.

For example, when the image compressed data 0Fh, F0h appears, the code FFh is included in the image compressed data when viewed the data 0Fh, F0h by shifting it on a bit unit basis, but it may be regarded that the code FFh is not included when viewed the data 0Fh, F0h on a byte unit basis. In the JPEG Standard, since both the marker and the compressed data are coded on a byte unit basis, the above rule is not applied.

When the JPEG data is converted from parallel data to serial data and then transmitted on a transmission line, the receiving station converts the received data to parallel data and detects a marker. In this case, the transmission data must be controlled in accordance with the significance of the marker by taking the synchronization on a byte unit basis (byte synchronization) of the data formed on a byte unit basis.

Even if the byte synchronization between the transmission station and the receiving station has so far been kept, if the transmission line is disconnected, for example, when the line is disconnected because an electromagnetic wave is blocked by a shield during the wireless transmission, the receiving station can no longer receives the signal from the transmission station. Thus, at the receiving station, the synchronization between a clock of a transmitter and a clock of a receiver is not kept and the clock of the transmitter and the clock of the receiver operate independently and the phases of the clocks of the transmitter and the receiver shifts gradually. Accordingly, when the transmission line returns from the disconnection state to the connection state, the byte synchronization between the transmitter and the receiver which heretofore has been kept may be lost.

Namely, when the transmission data is continuous in a state where the byte synchronization is kept, in the receiving station, all the data is detected and processed on a byte unit basis coincident with the original partition of byte of the transmission data. Once the byte synchronization is lost between the transmission station and the receiving station, the receiving station can no longer detect the marker of the byte unit basis transmitted from the transmission station because the data is detected and processed on a byte unit basis which is shifted from the original partition of byte, and hence the byte synchronization can no longer be performed.

In order to prevent it, means for detecting the SOI marker or the EOI marker while shifting the data one bit at a time may be provided in the receiver. In this case, when the synchronization is lost, the bit-unit-basis detection function of the detection means is activated to detect the marker, and the detection is changed from the bit-unit-basis detection to the byte-unit-basis detection from the detection of the marker so that the synchronization is recovered.

However, the following problem arises when the bit-unit-basis detection is activated.

That is, when the code FFh occurs on a byte unit basis coincident with the original partition of byte in the image compressed data, the code FFh may be discriminated from the marker having a code other than 00h following FFh since 00h is inserted following the code FFh as described above. However, if the data FFh appears in a state where it deviates 1 to 7 bits from the original partition of byte, the rule is not applied. Accordingly, a code same as that of the SOI marker or the EOI marker may occur in the image data while the code deviates 1 to 7 bits from the original partition of byte. Thus, in the case where the byte synchronization is lost, it is detected that there is the SOI marker or the EOI marker by the detection function of the SOI marker or the EOI marker by the detection means while detecting the marker by shifting the image data bit by bit.

Namely, such image data is misrecognized as a marker by the detection function and it is processed as defined by the marker although it should be decompressed as the image data, and correct recovery of the image data is not attained.

Accordingly, it is necessary to detect the data from the transmitter as correct or synchronized byte unit basis to take synchronization even if the compressed image data which is out-of-byte synchronization and deviates 1 to 7 bits from the original partition of byte unit, or the marker is received from the transmitter.

As means for performing the byte synchronization, a stepping synchronization system or an HDLC transmission control protocol system may be used. In the stepping synchronization system, however, at least two bits, a start bit and a stop bit, must be additionally added to one byte of data and extra data which is about 20% as large as actual data must be transmitted, and the transmission efficiency is low. On the other hand, when the HDLC protocol is adopted, the marker and the image compressed data are in many cases transmitted continuously in the JPEG Standard data transmission and the data must be interrupted to insert the flag in order to keep the byte synchronization by the flag, and this again causes low transmission efficiency.

The low transmission efficiency means the need of longer transmission time and waste of time.

SUMMARY OF THE INVENTION

As described above, the prior art technique in which the byte synchronization is kept by the stepping synchronization system or the HDLC transmission control protocol has a drawback of low transmission efficiency. If the compression rate of the transmission data is raised in order to prevent it, the quality of the image data is lowered and the image quality must be sacrificed. Further, when the image is transmitted by selective frame drop (intermittent elimination of fields or frames), the motion of the image must be sacrificed.

In the continuous data transmission, when the byte synchronization is lost, the detection of the EOI marker on the byte unit basis is not attained, as described above. Thus, the switching from the detection of the EOI marker to the SOI marker detection function by the bit unit is not attained and the byte synchronization is lost.

As described above, when the JPEG data having the structure as shown in FIG. 1 is to be transmitted, if it is transmitted as serial data, the receiving station does not always recognize the unit (byte unit) of the eight bits, that is, the original partition of byte, forming the marker so that it detects the SOI marker on the byte unit basis while shifting the data bit by bit before it receives the SOI marker.

After the receiving station receives and detects the SOI marker, it sequentially receives and processes the data in synchronizm with the detected SOI marker on a byte unit basis. After the receiving station detects the EOI marker, it operates to detect the SOI marker on the byte unit basis by shifting the data bit by bit until the next SOI marker is received and detected.

In this manner, once the SOI marker is detected, the marker and the image data are received by the byte (eight bits) synchronization and on the byte unit basis. However, the transmission line might be disconnected, for example, the line is disconnected because the electromagnetic wave might be blocked by a shielding material during the wireless transmission. In such a case, since the transmission station and the receiving station operate with independent clocks respectively, the phases of the clocks of the transmission station and the receiving station which were in phase before the disconnection of the line are shifted so that the shift of one bit or more may occur.

It depends on the precision of the clocks at the transmission station and the receiving station and the duration of the line disconnection. When the clocks at the transmission station and the receiving station shift one bit or more (excluding a case in which the shift is a multiple of eight bits) the reception and the detection of the SOI marker correspond to the loss of the byte synchronization between the transmission station and the receiving station which has heretofore been kept.

As a result, in the transmission data sequence, since the subsequent markers (APP marker and EOI marker) are added on the byte unit basis in synchronization with the SOI marker, the EOI marker can no longer be detected. In order to detect the EOI marker in the out-of-synchronization state, it is necessary to return the operation mode to the byte unit basis detection while shifting data bit by bit (that is, bit synchronization mode) like the state before the reception of the SOI marker. However, in order to return the operation mode from by byte unit basis detection while shifting data byte by byte (that is, byte synchronization mode) to the bit-by-bit synchronization after the reception of the SOI marker, a trigger to change the synchronization is necessary but such a trigger is not present. It may be possible to use the disconnection of the line as the trigger to the change of the synchronization but the information on the disconnection of line may not always be acquired.

As a result, the marker shifted by one bit or more from the original partition of byte is required to be detected with the byte synchronization. Thus, the EOI marker added to the end of the frame or field of the transmission data sequence being out-of-synchronization and being received cannot be detected. Further, the SOI marker at the start of the frame or field of the transmission data sequence transmitted next cannot also be detected and the data transmitted from the transmission station is not reproducible at the receiving station and the recovery is not attained.

It is an object of the present invention to provide data transmission system and data transmission method which automatically recover the out-of-synchronization of a transmission data sequence without substantially lowering a transmission efficiency, and synchronization recovery method and apparatus in such transmission system.

In accordance with one aspect of the present invention, there is provided a synchronization recovery method in a data transmission system for transmitting a transmission data sequence from a transmission station to a receiving station as serial data, receiving the transmission data sequence at the receiving station and converting it to parallel data and processing the parallel data on a byte unit basis, the transmission data sequence comprising a plurality of continuous data portions each formed on a byte unit basis and including first predetermined code data (EOI marker), the synchronization recovery method comprising the steps of:

a) at the transmission station, inserting, into the transmission data sequence, out-of-synchronization the transmission data sequence derived by shifting the first predetermined code data (EOI marker) by from one bit to a predetermined number of bits at one bit pitch and transmitting; and b) at the receiving station, when a part of the out-of-synchronization detection code data sequence in the transmission data sequence is detected as the first predetermined code data during a period in which the transmission data sequence is received and subjected to serial to parallel conversion and processed on a byte unit basis, conducting an operation of the receiving station to recover the processing on a byte unit basis of the transmission data sequence to a synchronization state between the transmission station and the receiving station.

In accordance with the present invention, when out-of-synchronization state is detected at the receiving station, the serial to parallel conversion of the received transmission data sequence is switched from that on a byte unit basis to that on a bit unit basis in order to find a starting code of the next transmission data sequence or a code for synchronization on a byte unit basis. Namely, in the present invention, by merely inserting a small amount of synchronization recovery data, the out-of-synchronization may be automatically detected even if the out-of-synchronization occurs between the transmission station and the receiving station, and normal transmission data reception state is automatically recovered from the transmission data recoverable state at the receiving station.

In accordance with an example of the present invention, the step of conducting the operation to recover the synchronization state includes a step for switching the serial to parallel conversion of the transmission data sequence from a serial to parallel conversion on a byte unit basis in which the transmission data sequence is shifted byte by byte thereof and converted to parallel data on a byte unit basis to a serial to parallel conversion on a bit unit basis in which the transmission data sequence is shifted bit by bit thereof and converted to parallel data on a byte unit basis.

In accordance with an example of the present invention, the first predetermined code data (EOI marker) is data for triggering the switching of the serial to parallel conversion from that on a byte unit basis to that on a bit unit basis.

In accordance with an example of the present invention, the first predetermined code data (EOI marker) is the data representing the last portion of the transmission data sequence.

In accordance with an example of the present invention, the step of conducting the operation to recover the synchronization state includes steps of b-1) switching the serial to parallel conversion of the transmission data sequence from a serial to parallel conversion on a byte unit basis in which the transmission data sequence is shifted byte by byte thereof and converted to parallel data on a byte unit basis to a serial to parallel conversion on a bit unit basis in which the transmission data sequence is shifted bit by bit thereof and converted to parallel data on a byte unit basis;

b-2) detecting second predetermined code data (SOI marker) in a next transmission data sequence to conduct the processing on a byte unit basis of the next transmission data sequence of the transmission data sequence from the parallel data subjected to the serial to parallel conversion on a bit unit basis by the conversion means; and b-3) switching the serial to parallel conversion of the next transmission data sequence from the serial to parallel conversion on a bit unit basis to the serial to parallel conversion on a byte unit basis in response to the detection of the second predetermined code data (SOI marker) of the next transmission data sequence in the step b-2).

In accordance with an example of the present invention, the second predetermined code data (SOI marker) is the code data representing a head portion of the next transmission data sequence.

In accordance with an example of the present invention, the serial to parallel conversion on a byte basis of the transmission data sequence is a process to sequentially shift the serial data of the transmission data sequence on a byte unit basis and convert the shifted transmission data sequence to parallel data on a byte unit basis in synchronism with a byte unit of the serial data, and the serial to parallel conversion on a bit unit basis of the transmission data sequence is a process to sequentially shift the serial data of the transmission data sequence on a bit unit basis and convert the shifted transmission data sequence to parallel data on a byte unit basis in synchronism with a bit unit of the serial data.

When the transmission data sequence is data which conforms to the JPEG Standard, a code sequence including EOI markers shifted by one bit to seven bits, respectively and linked together is included in a predetermined marker of a header field of the image compressed data, and when the byte synchronization is lost, the EOI marker included in the predetermined marker is used as a synchronization recovery code.

By doing so, when the byte synchronization is lost for any reason, the shifts to the byte synchronization are 1 to 7 bits so that the EOI marker can be detected from the synchronous recovery code included in the predetermined marker.

In a normal operation, the SOI marker detection function is activated which detects the received data on a byte unit basis while shifting the received data bit by bit until the SOI marker is detected, and once the SOI marker is detected, the byte-unit-basis detection is conducted thereafter. When the EOI marker is detected, the byte-unit-basis detection is released to detect the SOI marker which is to appear next and the SOI marker is detected while shifting by one bit.

When the EOI marker included in the predetermined marker is detected, the received data is subsequently shifted bit by bit at a time and the SOI marker is monitored by the SOI marker detection function. When the SOI marker attached to the top of the next frame or field is detected, the byte synchronization is recovered.

DETAILED DESCRIPTION OF THE PREFERRED EMBODIMENTS

Prior to the explanation of embodiments of the present invention, concept of the present invention is described with reference to FIGS. 5 to 7. The present invention is applicable to a data transmission system which transmits transmission data sequence comprising a plurality of continuous data portions each formed on a byte unit basis and including predetermined code data (for example, data indicating start and end of the transmission data sequence), from a transmission station to a receiving station as serial data, and receives the transmission data sequence at the receiving station, converts it to parallel data and process it byte on a byte unit basis. Particularly, the present invention is applicable when the transmission data sequence has an area which a user may freely uses. As an example of such transmission data sequence, an embodiment in which the present invention is applied to a transmission data sequence conforming to the JPEG Standard is explained.

As described above, when the transmission data sequence conforming to the JPEG Standard as shown in FIG. 1 is to be transmitted, if it is transmitted as serial data, the receiving station cannot always recognize the unit (byte unit) of eight bits, that is, the partition of byte of the original data, forming the marker. Thus, prior to the reception of the SOI marker, the data is received on a byte unit basis while shifting the data bit by bit (i.e., bit synchronization mode) so as to detect the SOI marker.

After the SOI marker is received and detected, the subsequent data is sequentially received on a byte (eight bits) unit basis while shifting data byte by byte (i.e., byte synchronization mode) in synchronism with the SOI marker. After the EOI marker is detected, the data is detected in the bit synchronization mode until the SOI marker of the next transmission data sequence is received and detected.

If the byte synchronization is lost between the transmission station and the receiving station, the detection of the EOI marker in the byte synchronization mode is not attained so that the switching to the bit synchronization for the detection of the SOI marker is not attained and hence the byte synchronization is lost.

In the present invention, a "user freely usable area", for example, a user freely usable area in an APP marker or a COM marker shown in FIGS. 3 and 4 is used so that synchronization recovery code data sequence is inserted therein, whereby the EOI marker is automatically detected from the synchronization recovery code data sequence in the byte synchronization mode as ever even if the byte synchronization is lost between the transmission and receiving stations. In the embodiment, the freely usable area in the APP marker shown in FIG. 3 is used.

Figure 5:
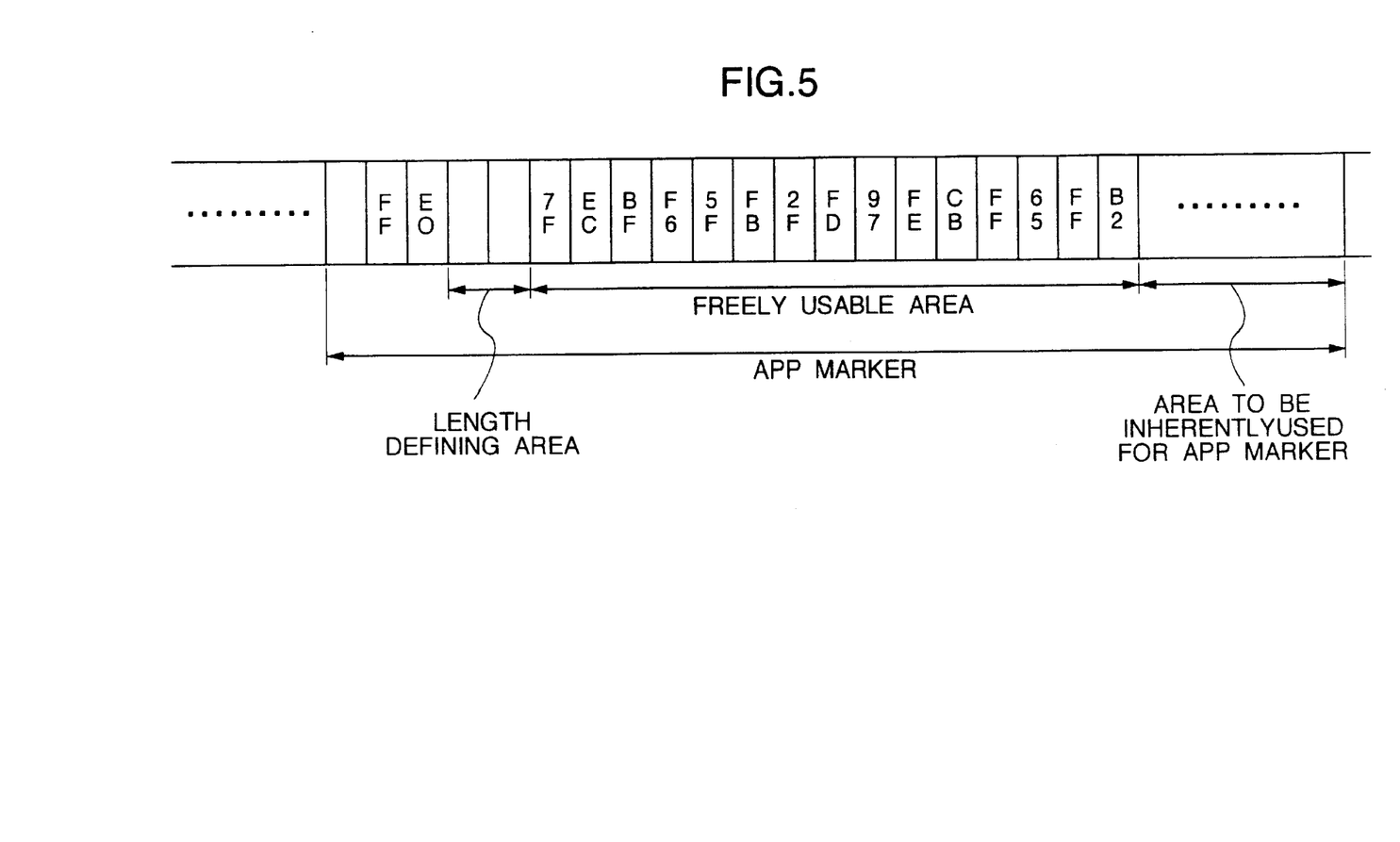
FIG. 5 shows a synchronization recovery code sequence included in the APP marker in an embodiment of the present invention.

Namely, as shown in FIG. 5, a code sequence having two-byte data (FFh, D9h) of the EOI marker shifted from one bit to seven bits, respectively, at one bit pitch, are inserted in the user freely usable area in the APP marker.

The inserted code sequence is now explained in detail.

Figure 6:
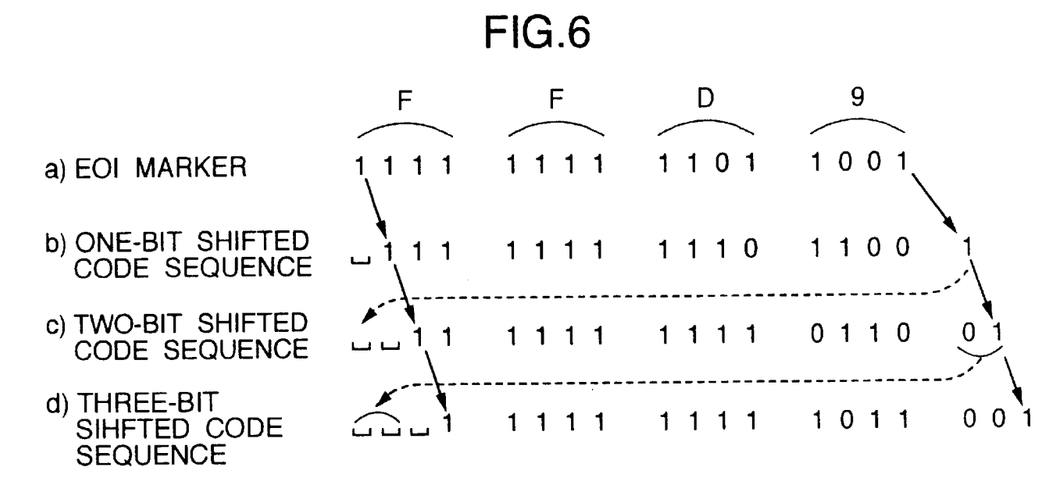
FIG. 6 shows code sequences of the EOI marker defined by the JPEG Standard, which are shifted bit by bit.

FIG. 6 shows code sequences representing the two-byte data FFh, D9h of the EOI marker which are formed by shifting the EOI marker by one bit, two bits and three bits, respectively.

a) of FIG. 6 shows FFh and D9h of the EOI marker, and b), c) and d) of FIG. 6 show the code sequences of FFh and D9h of the EOI marker, shifted by one bit, two bits and three bits, respectively. Similarly, seven code sequences of FFh and D9h of the EOI marker, shifted by one bit to seven bits, at one bit pitch, are prepared, and those code sequences are sequentially arranged as shown in FIG. 7 and "0s" are inserted between the code sequences as shown by wavy lines to from synchronization recovery (out-of-synchronization detection) code data sequence. Thus, as shown in FIGS. 5 and 7, the synchronization recovery code data sequence is:

7Fh, ECh, BFh, F6h, 5Fh, FBh, 2Fh, FDh, 97h, FEh, CBh, FFh, 65h, FFh, B2h

Figure 7:
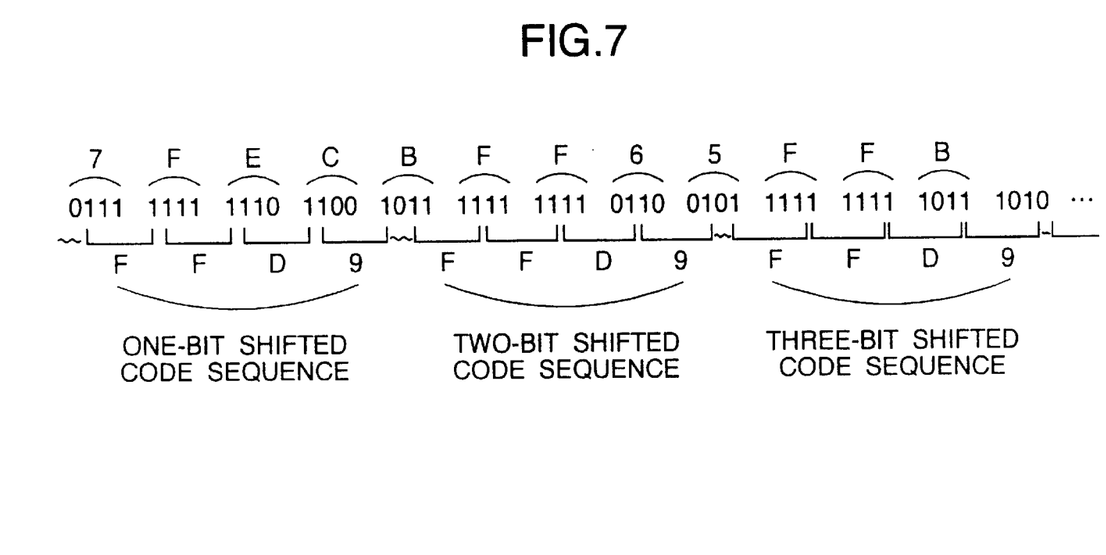
FIG. 7 shows a relation between the synchronization recovery code sequence included in the APP marker in the embodiment of the present invention and the EOI marker.

The out-of-synchronization detection code data sequence is not limited to one shown in FIG. 7 and the order of the code sequences of the data FFh, D9h of the EOI marker (that is, the order of the one, two, three, four, five, six and seven-bit shifted code sequences) may be different from that of FIG. 7.

In this respect, a) to g) of FIG. 12 show code sequences each formed by three bytes data and including the two-byte data FFh, D9h of the EOI marker, which are formed by shifting the EOI marker by one bit, two bits, three bits, four bits, five bits, six bits and seven bits, respectively.

It is possible to form the out-of-synchronization detection code data sequence by arranging these seven code sequences (that is, the code sequences a) to g) of FIG. 12) at an arbitrary sequence. However, since such an out-of-synchronization detection code data sequence amounts to twenty one bytes, it is preferable to use the code data sequence shown in FIG. 7 as the out-of-synchronization detection code data sequence.

By including the code sequence (synchronization recovery code data sequence) having the EOI markers shifted by one bit to seven bits at one bit pitch, in the predetermined location of the APP marker, even if the byte synchronization is lost between the transmission station and the receiving station by the disconnection of the transmission line, a portion of the synchronization recovery code data sequence inserted in the APP marker is detected as the EOI marker in the byte synchronization mode as ever.

When this code is detected as the EOI marker, it is determined that the system is in the out-of-synchronization state and the detection of the transmission data sequence in accordance with the byte synchronization mode (byte unit basis detection) is released, and the detection of the SOI marker in accordance with the bit synchronization mode (bit unit basis detection) is conducted.

When the SOI marker attached at the top of the frame or field of the next transmission data sequence is detected, the data may be sequentially received on the byte unit basis subsequently in accordance with the byte synchronization mode so that the byte synchronization is recovered between the transmission and receiving stations.

While the marker or the data cannot be correctly reproduced with the detected frame or field, the SOI marker at the top of the next received frame or field can be correctly detected and the marker or the data can be subsequently reproduced at the receiving station.

In accordance with the present invention, in data transmission method and apparatus for transmitting a transmission data sequence from a transmission station 10 to a receiving station 50 as serial data, receiving the transmission data sequence at the receiving station and converting it to parallel data and processing the parallel data on a byte unit basis (byte by byte), the transmission data sequence includes a plurality of continuous data portions each formed on a byte unit basis and including predetermined code data (code data for triggering the switching from the byte synchronization mode (serial/parallel convertion on a byte unit basis) to the bit synchronization mode (serial/parallel convertion on a bit unit basis) at the receiving station), a) at the transmission station, out-of-synchronization detection code data (synchronization recovery code data) sequence derived by shifting the predetermined code data (e.g., EOI marker) by from one bit to a predetermined number (for example, 7) bits at one bit pitch is inserted into the transmission data sequence and it is transmitted; and b) at the receiving station, when a part of out-of-synchronization detection code data sequence in the transmission data sequence is detected as the first predetermined code data during a period in which the transmission data sequence is received and subjected to serial to parallel conversion and processed on a byte unit basis, conducting an operation of the receiving station to recover the processing on a byte unit basis of the transmission data sequence to a synchronization state between the transmission station and the receiving station. Namely, when a part of the out-of-synchronization detection code data sequence is detected as the predetermined code data at the receiving station, the processing of the transmission data sequence is switched from the serial/parallel (S/P) convertion on a byte unit basis to the serial/parallel (S/P) convertion on a bit unit basis in order to find the code representing the top of the next transmission data sequence or the code (for example, SOI marker) for synchronization on the byte unit basis. As the predetermined code data (code data for triggering the switching at the receiving station from the S/P convertion on a byte unit basis to the S/P convertion on a bit unit basis), the code data (for example, EOI marker) representing the last portion of the transmission data sequence may be used. The S/P conversion on a byte unit basis means to shift the transmission data sequence byte by byte thereof and convert the shifted data sequence to parallel data on a byte unit basis. The S/P conversion on a bit unit basis means to shift the transmission data sequence bit by bit thereof and convert the shifted data sequence to parallel data on a byte unit basis.

An embodiment of the synchronization recovery method and apparatus in the data transmission system according to the present invention is now explained in detail.

Figure 8:
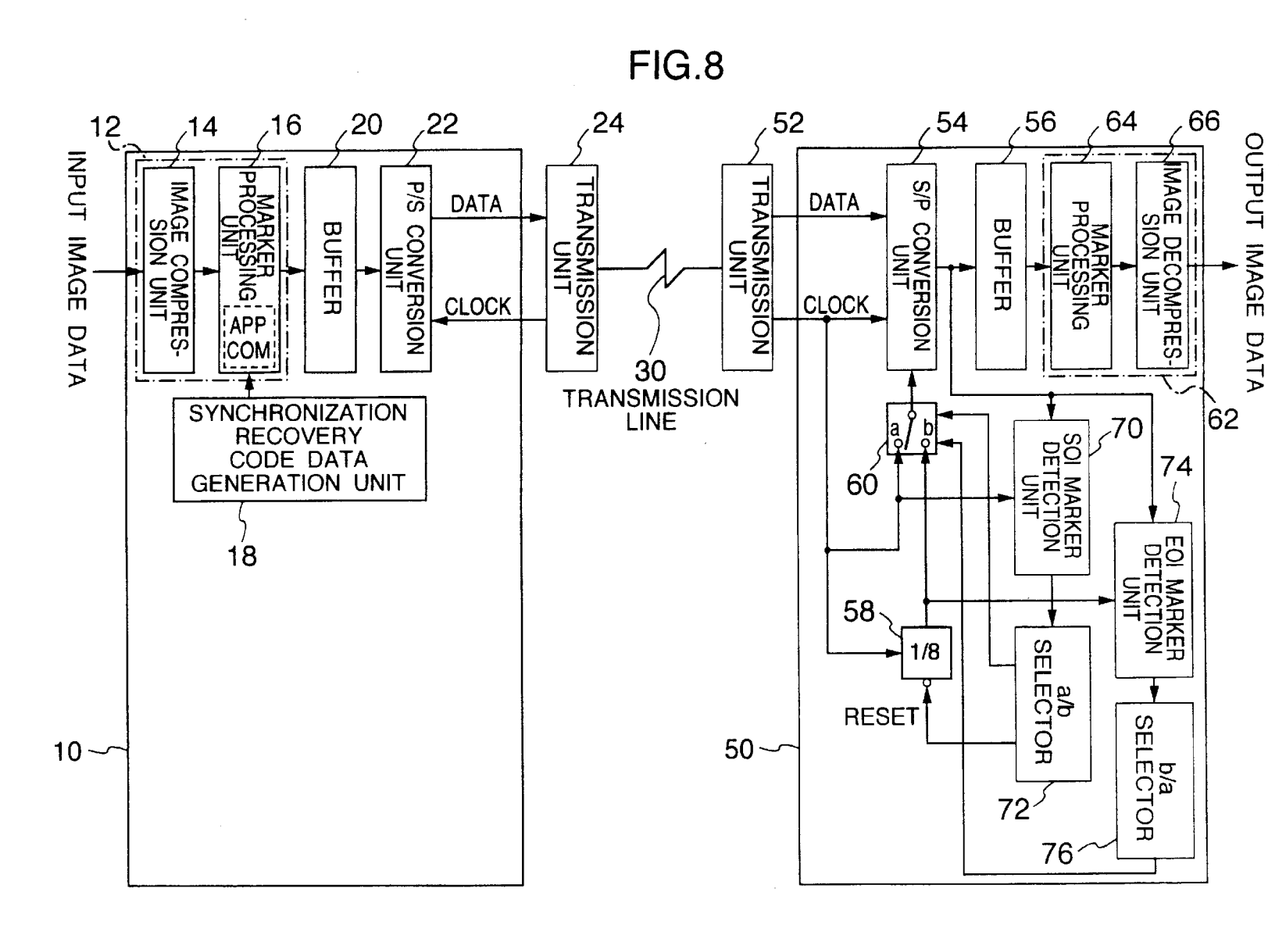
FIG. 8 shows a functional block diagram of an overall configuration of a data transmission system to which the embodiment of the synchronization recovery method and apparatus of the present invention is applied.

FIG. 8 shows a functional block diagram of an overall configuration of the data transmission system to which the embodiment of the synchronization recovery method and apparatus of the present invention is applied. In the present embodiment, the transmission of the transmission data sequence conforming to the JPEG Standard is explained as an example of the transmission data sequence.

In FIG. 8, the data transmission system comprises a transmission unit 10, a receiving unit 50, and a transmission station transmission unit 24 and a receiving station transmission unit 52 for transmitting data between the units 10 and 50, and a transmission line 30. The present invention is applicable when the transmission data sequence is transmitted by wire or wireless between the transmission unit 10 and the receiving unit 50.

In the transmission unit 10, input data (for example, digital image data) is inputted to an image compression unit 14 and compressed thereby, and the image compressed data is applied to a marker processing unit 16. The marker processing unit 16 generates an APP marker (or a COM marker) including the synchronization recovery code data sequence described above and shown in FIGS. 5 and 7, and also generates other markers such as SOI marker and EOI marker, adds them to the image compressed data and applies it to a buffer 20 as one frame of or one field of JPEG data. The synchronization recovery code data sequence may be given from a synchronization recovery code data sequence generation unit 18 constructed by a microcomputer, for example.

The image compression unit 14 and the marker processing unit 16 may be constructed by a dedicated LSI 12, for example, Fuji Film Microdevice Co., MD36050X.

The buffer 20 applies one frame of or one field of input JPEG data to a parallel/serial (P/S) conversion unit 22 which converts one frame of or one field of JPEG data to serial data and applies it to transmission unit 24. The P/S conversion unit 22 conducts the parallel/serial conversion in synchronism with a clock from the transmission unit 24. The transmission unit 24 sends the JPEG data which is the serial data to the receiving unit 50 through the transmission line 30.

The transmission unit 10 operates by a clock which is in synchronism with the clock from the transmission unit 24.

Figure 9:
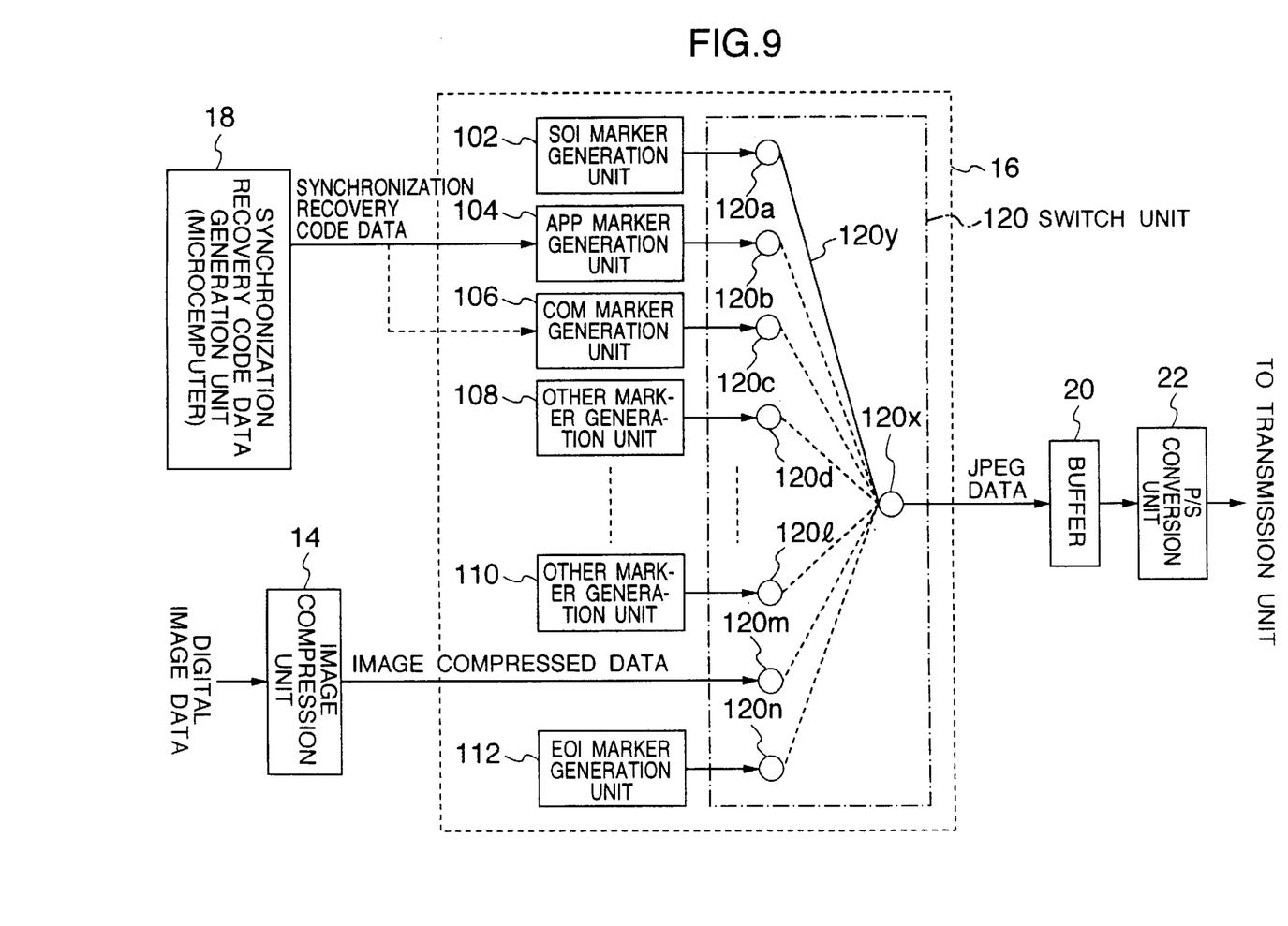
FIG. 9 shows a functional block diagram for illustrating an operation of a marker processing unit in FIG. 8.
Figure 10A:
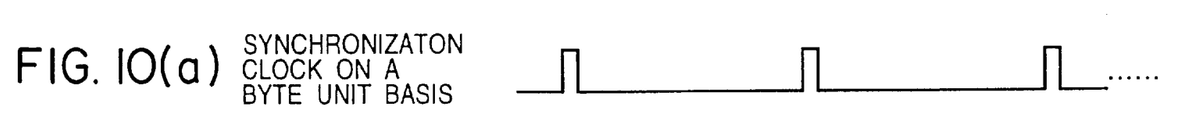
FIG. 10 shows a timing chart for illustrating byte unit basis and bit unit basis serial/parallel conversion operations in an S/P conversion unit in FIG. 8.
Figure 10B:
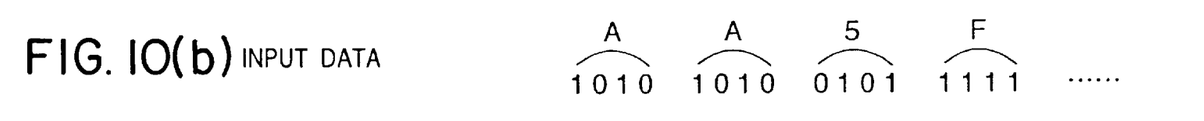
Figure 10C:
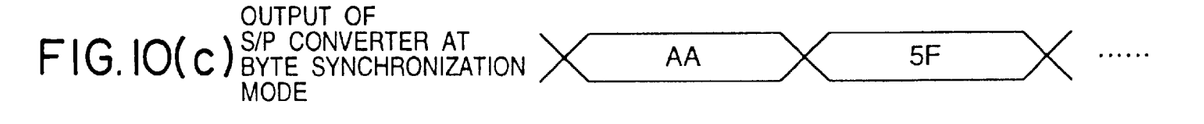
Figure 10D:
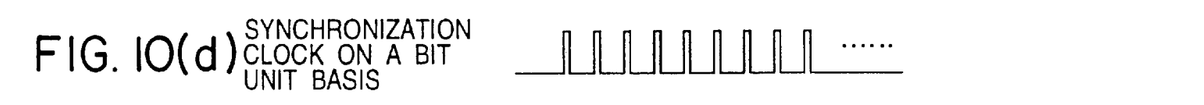
Figures 10E, 10F:
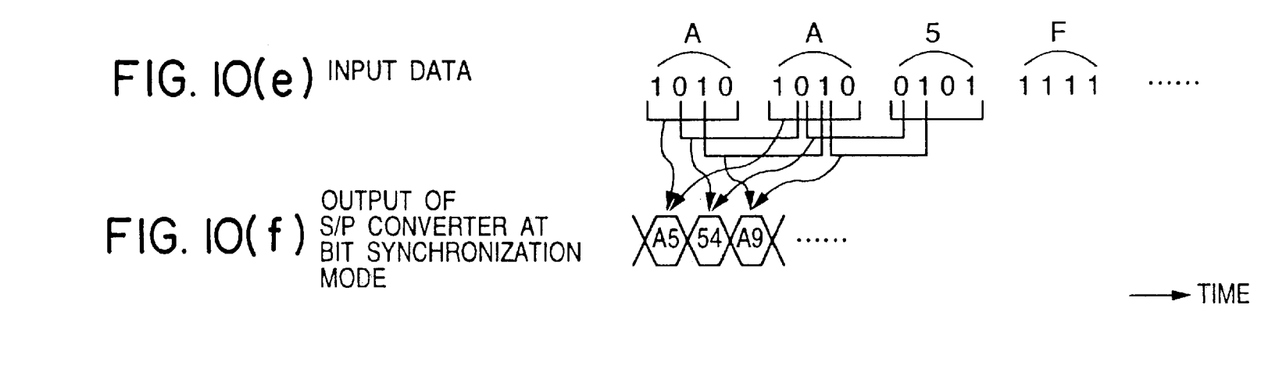

An operation of the marker processing unit 16 is now explained with reference to a functional block diagram of FIG. 9. In FIG. 9, the marker processing unit 16 includes an SOI marker generation unit 102, an APP marker generation unit 104, a COM marker generation unit 106, other marker generation units 108≠110 and an EOI marker generation unit 112, as well as a switch unit 120.

At the initial setting of the transmission system, the synchronization recovery code data sequence (7Fh, Ech, . . . , FFh, 65h, FFh, B2h) described above and shown in FIGS. 5 and 7 supplied from the synchronization recovery code data sequence generation unit 18 is applied to the APP marker generation unit 104 and set in the "freely usable area" of the APP marker. Accordingly, the APP marker generation unit 104 subsequently generates the APP marker shown in FIG. 5 which includes the synchronization recovery code data sequence. The switch unit 120 comprises input terminals 120a, 120b, 120c, 120d, . . . , 120l, 120m and 120n, an output terminal 120x and an armature 120y. In the switch unit 120, the armature 120y is sequentially connected to the input terminals 120a, 120b, 120c, 120d, . . . , 120l, 120m and 120n and first receives the SOI marker from the SOI marker generation unit 102 and outputs it to the buffer 20, then receives the APP marker including the synchronization recovery code data sequence from the APP marker generation unit 104 and outputs it to the buffer, then receives the COM marker from the COM marker generation unit 106 and outputs it to the buffer, then receives the markers from the other marker generation units 108≠110 and outputs them to the buffer, then receives the image compressed data from the image compression unit 14 and outputs it to the buffer, and finally receives the EOI marker from the EOI marker generation unit 112 and outputs it to the buffer. In this manner, the JPEG Standard data (transmission data sequence) having the markers added to the image compressed data is outputted to the buffer 20 from the marker processing unit 16.

The switch unit 120 may be constructed by an electronic switch such as transistors.

Configuration and operation of the receiving unit 50 are now explained.

The transmission unit 52 receives the JPEG data (transmission data sequence) which is the serial data sent from the transmission unit 10 and applies it to the serial/parallel (S/P) conversion unit 54. The S/P conversion unit 54 conducts the serial/parallel conversion of the JPEG data on the byte unit basis while shifting the input data byte by byte (i.e., the S/P conversion on the byte unit basis) in synchronism with the clock from the clock switching unit 60. The transmission unit 52 applies a received clock, that is, a synchronization clock on a bit unit basis to the respective portions of the receiving unit 50 so that the receiving unit 50 operates by a clock which is in synchronism with the clock from the transmission unit 52.

The synchronization clock on the bit unit basis (bit-by-bit synchronization clock) from the transmission unit 52 is applied to a ⅛ frequency divider 58 having a frequency division factor of eight and also applied to an input terminal a of the clock switch 60. The ⅛ frequency divider 58 generates a ⅛ frequency divided clock (synchronization clock on a byte unit basis, that is, byte-by-byte synchronization clock) which is the bit-by-bit synchronization clock from the transmission unit 52 divided by the frequency division factor of eight in synchronism with a pulse from an a/b selector 72 to be described later and applies it to an input terminal b of the clock switch 60. The clock switch 60 selects one of the bit-by-bit synchronization clock from the transmission unit 52 and the ⅛ frequency divided synchronization clock (byte-by-byte synchronization clock) from the ⅛ frequency divider 58 in response to the pulses from the a/b selector 72 and the b/a selector 76 to be described later, and applies it to the S/P conversion unit 54.

When the clock from the clock switch 60 is the byte-by-byte synchronization clock, the S/P conversion unit 54 conducts the serial/parallel conversion on the byte unit basis of the JPEG data in synchronism with the byte-by-byte synchronization clock. On the other hand, when the clock from the clock switch 60 is the bit-by-bit synchronization clock, the unit 54 conducts the serial/parallel conversion on the bit unit basis of the JPEG data in synchronism with the bit-by-bit synchronization clock.

FIG. 10 shows a timing chart for illustrating the serial/parallel conversion on the byte unit basis and the serial/parallel conversion on the bit unit basis in the S/P conversion unit 54. a) of FIG. 10 shows the byte-by-byte synchronization clock from the clock switch 60 and d) of FIG. 10 shows the bit-by-bit synchronization clock. b) and e) of FIG. 10 show the JPEG data (serial data) inputted to the S/P conversion unit 54, for example, AAh (1010 1010), 5Fh (0101 1111), .... When the S/P conversion unit 54 conducts the serial/parallel conversion on the byte unit basis, the S/P conversion unit 54 sequentially converts the input JPEG data to byte-synchronous parallel data AAh, 5Fh, ..., on the byte unit basis as shown in b) of FIG. 10 in synchronism with the byte-by-byte synchronization clock and outputs it. The byte synchronous data means data synchronous on the byte unit basis with the data of the transmission station. On the other hand, when the S/P conversion unit 54 conducts the serial/parallel conversion on the bit unit basis, it sequentially converts the input JPEG data to bit synchronous parallel data AAh, 54h, A9h, ..., on the byte unit basis as shown in e) and f) of FIG. 10 in synchronism with the bit-by-bit synchronization clock while shifting the input data bit by bit in synchronous therewith and outputs it. Namely, the first one byte of parallel data is the parallel conversion version of the input data AAh, and the next one byte of parallel data is the one-bit shifted version (0101 0100) of the input data AAh, 5Fh, that is, 54h. Similarly, the next one byte of parallel data is the two-bit-shifted version (1010 1001) of the input data AAh, 5Fh, that is, A9h.

The parallel data from the S/P conversion unit 54 is applied to the buffer 56 and also applied to the SOI marker detection unit 70 and the EOI marker detection unit 74.

When one frame of or one field of parallel data is inputted to the buffer 56, it applies the parallel data to the marker processing unit 64 which separates the markers and the compressed image data from the byte synchronous JPEG data and applies the image compressed data to the image decompression unit 66. The image decompression unit 66 decompresses the image compressed data and outputs the image. The marker processing unit 64 and the image decompression unit 66 may be constructed by a dedicated LSI 62, for example, Fuji Film Microdevice Co., MD36050X as it is for the transmission unit 10.

The SOI marker detection unit 70 detects the SOI marker from the parallel data from the S/P conversion unit 54 in synchronism with the bit-by-bit synchronization pulse from the transmission unit 52. When it detects the SOI marker, it applies a pulse to the a/b selector 72. Then, the a/b selector 72 responds to the pulse from the SOI marker detection unit 70 to output a pulse which is applied to a reset terminal of the ⅛ frequency divider 58 to reset the ⅛ frequency divider 58. Accordingly, the ⅛ frequency divided synchronization clock from the ⅛ frequency divider 58 is subsequently in synchronism with the pulse from the a/b selector 72. Further, the pulse from the a/b selector 72 is applied to the clock switch 60. Then, the clock switch 60 responds to the pulse from the a/b selector 72 to select the ⅛ frequency divided synchronization clock (byte-by-byte synchronization clock) inputted to the input terminal b from the ⅛ frequency divider in place of the bit-by-bit synchronization clock inputted to the input terminal a from the transmission unit 52 and applies it to the S/P conversion unit 54. Accordingly, the S/P conversion unit 54 subsequently conducts the serial/parallel conversion on the byte unit basis of the JPEG data in synchronism with the byte-by-byte synchronization clock from the clock switch 60. Namely, when the code (i.e., SOI marker) indicating the beginning of the JPEG Standard transmission data sequence is detected, the S/P conversion on the byte unit basis is conducted to detect the data in the header field of the transmission data sequence and the compressed image data.

On the other hand, the EOI marker detection unit 74 detects the EOI marker (FFh, D9h) from the parallel data from the S/P conversion unit 54 in synchronism with the byte-by-byte synchronization clock from the ⅛ frequency divider 58. When the unit 74 detects the EOI marker, it applies a pulse to the b/a selector 76. Then, the b/a selector 76 responds to the pulse from the EOI marker detection unit 74 to output a pulse which is applied to the clock switch 60. Then, the clock switch 60 responds to the pulse from the b/a selector 76 to select the bit-by-bit synchronization clock inputted to the input terminal a from the transmission unit 52 in place of the ⅛ frequency divided synchronization clock (byte-by-byte synchronization clock) inputted to the input terminal b from the ⅛ frequency divider 58, and applies it to the S/P conversion unit 54. Accordingly, the S/P conversion unit 54 subsequently conducts the serial/parallel conversion on the bit unit basis of the JPEG data in synchronism with the bit-by-bit synchronization clock. Namely, when the code indicating the last of the JPEG Standard transmission data sequence is detected, the S/P conversion on the bit unit basis is conducted to detect the code (SOI marker) indicating the start of the next transmission data sequence.

Figure 11:
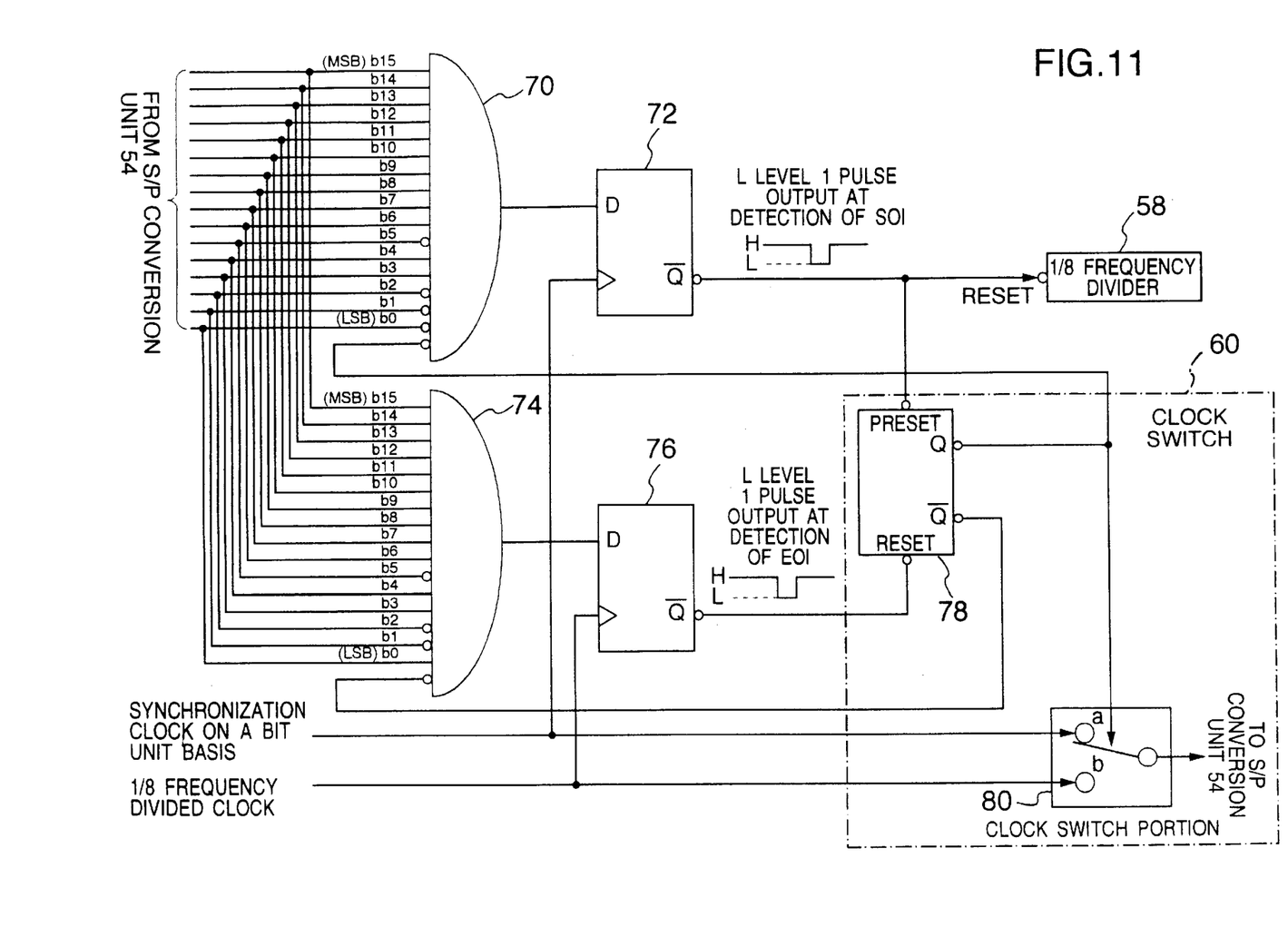
FIG. 11 shows a block diagram of configurations of SOI marker and EOI marker detection units in a receiving station in FIG. 8.
Figure 12A:
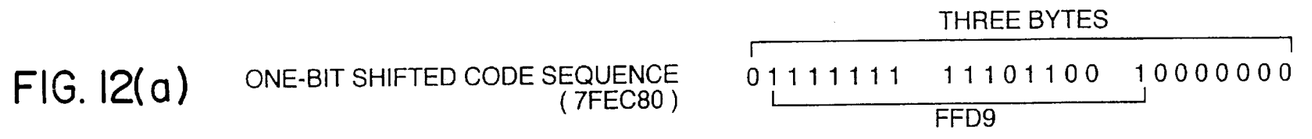
FIG. 12 shows code data sequences of the EOI marker defined by the JPEG standard, which are shifted bit by bit.
Figure 12B:
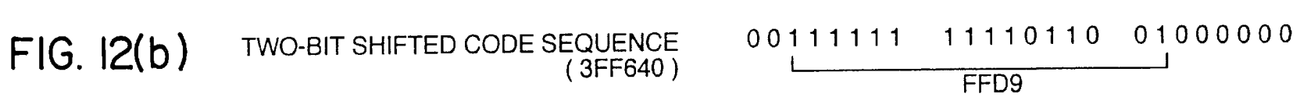
Figure 12C:
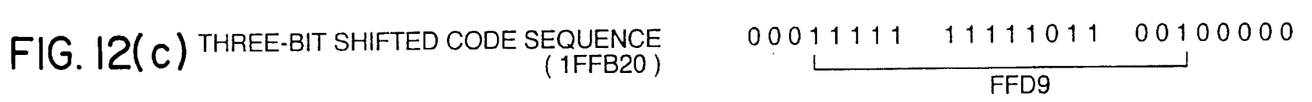
Figure 12D:
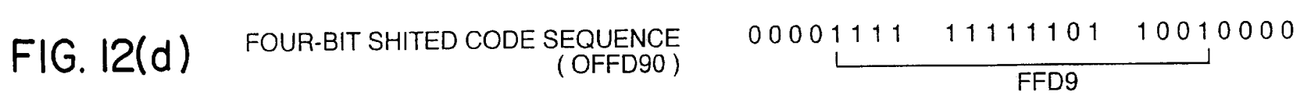
Figure 12E:
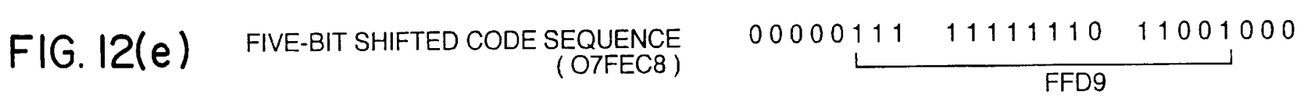
Figure 12F:
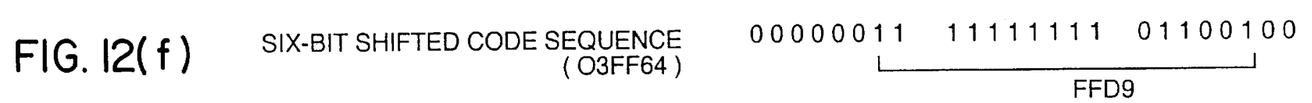
Figure 12G:
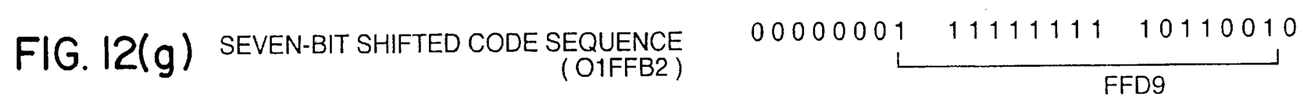

Referring to FIG. 11, a specific configuration of the SOI marker detection unit 70, the EOI marker detection unit 74, the a/b selector 72, the b/a selector 76 and the clock switch 60 is explained. In FIG. 11, the SOI marker detection unit 70 comprises an AND gate, the EOI marker detection unit 74 comprises an AND gate, the a/b selector 72 comprises a D-type flip-flop, the b/a selector 76 comprises a D-type flip-flop and the clock switch 60 comprises a flip-flop 78 and a clock switch portion 80 (for example, electronic switch such as a transistor). The AND gates 70 and 74 receive the parallel data from the S/P conversion unit 54. In the present embodiment, the parallel data is inputted 16 bits (two bytes) basis at a time. The output of the AND gate 70 is inputted to a D-type input terminal of the D-type flip-flop 72 and a bit-by-bit synchronization clock is inputted to a clock input terminal of the D-type flip-flop from the transmission unit 52. The AND gate 70 receivers the inversion of the bit input of b0, b1, b2 and b5 of the 16-bit parallel data from the S/P conversion unit 54 to detect the 16-bit SOI marker (FFD8h). A $\overline{Q}$ output of the D-type flip-flop 72 is applied to a reset input of the flip-flop 78 and also applied to a reset input of the ⅛ frequency divider 58. A Q output of the flip-flop 78 is applied to an additional input terminal serving as an inverting enable terminal of the AND gate 70.

On the other hand, the output of the AND gate 74 is applied to the D input terminal of the D-type flip-flop 76, and the byte-by-byte synchronization clock is inputted to the clock input terminal of the D-type flip-flop 76 from the ⅛ frequency divider 58. The AND gate 74 receives the inversion of the bit input b1, b2 and b5 of the 16-bit parallel data from the S/P conversion unit 54 to detect the 16-bit EOI marker (FFh, D9h). The $\overline{Q}$ output of the flip-flop 78 is applied to an additional input terminal serving as an inverting enable terminal of the AND gate 74.

A configuration of FIG. 11 is now explained. When the parallel data from the S/P conversion unit 54 is the SOI marker, the AND gate 70 outputs a high level pulse since all inputs thereof become "1" and applies it to the D input terminal of the D-type flip-flop 72. Then, the D-type flip-flop 72 outputs a low level pulse from its $\overline{Q}$ output and applies it to the inverting preset input of the flip-flop 78 to render the Q output thereof to a high level and switches the clock switch 80 to the terminal b. Accordingly, the byte-by-byte synchronization clock is subsequently applied to the S/P conversion unit 54. The low level pulse from the $\overline{Q}$ output of the D-type flip-flop 72 is also applied to the reset input of the ⅛ frequency divider 58 to reset the ⅛ frequency divider 58 to cause the byte-by-byte synchronization clock to synchronize with the low level pulse from the $\overline{Q}$ output of D-type flip-flop 72, that is, the SOI marker of the received transmission data sequence. The Q output of the flip-flop 78 is applied to the additional input terminal of the AND gate 70 after being inverted. Accordingly, when the Q output of the flip-flop 78 is a high level, the additional input terminal of the AND gate 70 becomes low level and hence the gate 70 is disabled, so that the AND gate 70 does not receive the parallel data from the S/P conversion unit 54. In this case, the $\overline{Q}$ output of the flip-flop 78 is low level and applied to the additional input terminal of the AND gate 74 after being inverted. Accordingly, the additional input terminal of the AND gate 74 becomes high level to enable it and the AND gate 74 receives the parallel data (f) of FIG. 10) synchronization with the bit-by-bit synchronization clock from the S/P conversion unit 54. In this manner, before the detection of the SOI marker, the SOI detection unit 70 (AND gate 74) sequentially receives the parallel data (f) of FIG. 10) synchronization with the bit-by-bit synchronization clock from the S/P conversion unit 70 and conducts the SOI marker detection operation. When the unit 70 detects the SOI marker, it stops the SOI marker detection operation until the EOI marker detection unit 74 detects the EOI marker of the transmission data sequence including the detected SOI marker.

When the parallel data from the S/P conversion unit 54 is the EOI marker, the AND gate 74 outputs the high level pulse since all inputs thereof become "1" and applies it to the D input terminal of the D-type flip-flop 76. Namely, in a state where the byte synchronization is kept between the transmission and receiving stations, when the EOI marker is detected, the AND gate 74 outputs the high level pulse. In contrast, in a state where the byte synchronization is not kept, when the EOI marker is detected from the synchronization recovery code data sequence, the AND gate 74 outputs the high level pulse. Then, the D-type flip-flop 76 outputs the low level pulse from its $\overline{Q}$ output and applies it to the reset input of the flip-flop 78 after being inverted to render the Q output thereof to the low level and switches the clock switch 80 to the terminal. Accordingly, thereafter, the bit-by-bit synchronization clock is subsequently applied to the S/P conversion unit 54. The $\overline{Q}$ output of the flip-flop 78 is applied to the additional input terminal of the AND gate 74 after being inverted. Accordingly, the additional input terminal of the AND gate 74 becomes low level to disable it and the AND gate 74 does not receive the parallel data from the S/P conversion unit 54. In this case, the Q output of the flip-flop 78 is low level and the low level from the Q output is applied to the additional input terminal of the AND gate 70 after being inverted. Accordingly, the additional input terminal of the AND gate 70 becomes high level to enable it and the AND gate 70 receives the parallel data (c) of FIG. 10) synchronization with the byte-by-byte clock from the S/P conversion unit 54. In this manner, before the detection of the EOI marker, the EOI marker detection unit 74 (AND gate 74) sequentially receives the parallel data (c) of FIG. 10) from the S/P conversion unit 54 synchronization with the byte-by-byte synchronization clock to conduct the EOI marker detection operation, and when it detects the EOI marker, it stops the operation until the SOI marker detection unit 74 detects the SOI marker of the next transmission data sequence.

In this manner, in the present embodiment, after the detection of the EOI marker, the S/P conversion unit 54 sequentially shifts the transmission data sequence one bit at a time in synchronism with the bit-by-bit synchronization clock and converts it to parallel data on the byte unit basis (that is, conducts the S/P conversion on a bit with basis) and outputs it. The SOI marker detection unit 70 detects the SOI marker of the next transmission data sequence in synchronism with the bit-by-bit synchronization clock from the S/P conversion unit 54, and when the SOI marker detection unit 70 detects the SOI marker of the next transmission data sequence, the S/P conversion unit 54 sequentially converts the transmission data sequence to the parallel data on the byte unit basis in synchronism with the byte-by-byte synchronization clock (that is, conducts the S/P conversion on a byte unit basis) and outputs it. Thereafter, the EOI marker detection unit 74 detects the EOI marker of the next transmission data sequence in synchronism with the byte-by-byte synchronization clock from the S/P conversion unit 54, and if the byte synchronization of the data is maintained between the transmission and receiving stations, it detects the EOI marker of the next transmission data sequence. Then, the S/P conversion unit 54 is switched to the S/P conversion on the bit unit basis and the receiving unit is placed in a state for detecting the SOI marker of the next transmission data sequence.

On the other hand, if the byte synchronization of the data is not maintained, the EOI marker detection unit 74 detects a part of the synchronization recovery code data sequence of the next transmission data sequence as the EOI marker. Then, the S/P conversion unit 54 is switched from the S/P conversion on the byte unit basis to the S/P conversion on the bit unit basis and the receiving unit is placed in a state for detecting the SOI marker of the next transmission data sequence. Accordingly, even if the synchronization is lost, the synchronization state can be recovered from the next transmission data sequence.

In the present embodiment, the synchronization recovery special code is included in the APP marker although it may be included in the "user freely usable area" in the COM marker.

In the present embodiment, while the present invention is applied to the data conforming to the JPEG Standard, the present invention is not limited thereto but may be applicable to data having similar format. Namely, the present invention is applicable to a transmission data sequence including a plurality of continuous data portions each formed on a byte unit basis and including predetermined code data (code data for triggering the switching from the S/P conversion on a bit unit basis to the S/P conversion on a byte unit basis and code data for triggering the switching from the S/P conversion on a byte unit basis to the S/P conversion on a bit unit basis), which transmission data sequence is transmitted from the transmission station to the receiving station as the serial data and received at the receiving station and converted to the parallel data and processed on a byte unit basis.

Namely, instead of detecting the SOI marker as the code data for triggering the switching from the S/P conversion on a bit unit basis to the S/P conversion on a byte unit basis, the code representing the head portion of the transmission data sequence or the code for the synchronization may be detected. Further, instead of detecting the EOI marker as the code data for triggering the switching from the S/P conversion on a byte unit basis to the S/P conversion on a bit unit basis, the code indicating the last portion of the transmission data sequence may be detected.

In accordance with the present invention, by inserting a small amount of synchronization recovery data to the transmission data sequence, the out-of-synchronization is automatically detected even if the out-of-synchronization occurs between the transmission station and the receiving station, and the synchronization is recovered at the transmission station and the receiving station so that the automatic recovery from the non-recoverable state of the transmission data sequence at the receiving station to the normal reception state of the transmission data sequence is attained.

What is claimed is:

1. A synchronization recovery method in a data transmission system for transmitting a transmission data sequence from a transmission station to a receiving station as serial data, receiving the transmission data sequence at the receiving station and converting it to parallel data and processing the parallel data on a byte unit basis, said transmission data sequence comprising a plurality of continuous data portion each formed on a byte unit basis and including first predetermined code data, said synchronization recovery method comprising the steps of:

a) at said transmission station, inserting, into said transmission data sequence, out-of-synchronization detection code data sequence derived by shifting said first predetermined code data by from one bit to a predetermined number of bits at one bit pitch and transmitting; and     b) at said receiving station, when a part of said out-of-synchronization detection code data sequence in said transmission data sequence is detected as said first predetermined code data during a period in which said transmission data sequence is received and subjected to serial to parallel conversion and processed on a byte unit basis, conducting an operation of said receiving station to recover the processing on a byte unit basis of said transmission data sequence to a synchronization state between the transmission station and the receiving station.

2. A synchronization recovery method according to claim 1, wherein said step of conducting the operation to recover the synchronization state includes a step for switching the serial to parallel conversion of said transmission data sequence from a serial to parallel conversion on a byte unit basis in which said transmission data sequence is shifted byte by byte thereof and converted to parallel data on a byte unit basis to a serial to parallel conversion on a bit unit basis in which said transmission data sequence is shifted bit by bit thereof and converted to parallel data on a byte unit basis.

3. A synchronization recovery method according to claim 2, wherein said step a) includes a step for inserting at said transmission station, into said transmission data sequence, said out-of-synchronization detection code data sequence which is derived by shifting said first predetermined code data, serving as data for triggering the switching of the serial to parallel conversion of said transmission data sequence from said serial to parallel conversion on a byte unit basis to said serial to parallel conversion on a bit unit basis, by from one bit to said predetermined number of bits at one bit pitch.

4. A synchronization recovery method according to claim 2, wherein said step a) includes a step for inserting at said transmission station, into said transmission data sequence, said out-of-synchronization detection code data sequence which is derived by shifting said first predetermined code data serving as data representing a last portion of the transmission data sequence by from one bit to said predetermined number of bits at one bit pitch.

5. A synchronization recovery method according to claim 1, wherein said step of conducting the operation to recover the synchronization state includes steps of     b-1) switching the serial to parallel conversion of said transmission data sequence from a serial to parallel conversion on a byte unit basis in which said transmission data sequence is shifted byte by byte thereof and converted to parallel data on a byte unit basis to a serial to parallel conversion on a bit unit basis in which said transmission data sequence is shifted bit by bit thereof and converted to parallel data on a byte unit basis;

b-2) detecting second predetermined code data in a next transmission data sequence to conduct the processing on a byte unit basis of the next transmission data sequence of said transmission data sequence from the parallel data subjected to the serial to parallel conversion on a bit unit basis by said conversion means; and b-3) switching the serial to parallel conversion of said next transmission data sequence from the serial to parallel conversion on a bit unit basis to the serial to parallel conversion on a byte unit basis in response to the detection of said second predetermined code data of said next transmission data sequence in said step b-2).

6. A synchronization recovery method according to claim 5, wherein said step b-2) detects code data representing a head portion of said next transmission data sequence as said second predetermined code data.

7. A synchronization recovery method according to claim 2, wherein the serial to parallel conversion on a byte basis of said transmission data sequence is a process to sequentially shift the serial data of the transmission data sequence on a byte unit basis and convert the shifted transmission data sequence to parallel data on a byte unit basis in synchronism with a byte unit of the serial data, and the serial to parallel conversion on a bit unit basis of said transmission data sequence is a process to sequentially shift the serial data of the transmission data sequence on a bit unit basis and convert the shifted transmission data sequence to parallel data on a byte unit basis in synchronism with a bit unit of the serial data.

8. A synchronization recovery method according to claim 1, wherein said transmission data sequence is a transmission data sequence conforming to JPEG Standard and said first predetermined code data is an EOI marker.

9. A synchronization recovery method according to claim 8, wherein said step a) includes a step for inserting said out-of-synchronization detection code data sequence into a predetermined marker of a header field of said transmission data sequence.

10. A synchronization recovery method according to claim 9, wherein the predetermined marker of the header field of said transmission data sequence is an APP marker.

11. A synchronization recovery method according to claim 9, wherein the predetermined marker of the header field of said transmission data sequence is a COM marker.

12. A synchronization recovery method according to claim 8, wherein said predetermined number of bits is 7.

13. A synchronization recovery apparatus in a data transmission system for transmitting a transmission data transmission system for transmitting a transmission data sequence from a transmission station to a receiving station, receiving said transmission data sequence at the receiving station, converting it to parallel data and processing the parallel data on a byte unit basis, said transmission data sequence comprising a plurality of continuous data portions each formed on a byte unit basis and including first predetermined code data, said transmission station comprising:

means for generating out-of-synchronization detection code data sequence by shifting said first predetermined code data by from one bit to a predetermined number of bits at one bit pitch;

out-of-synchronization detection code data sequence insertion means for inserting said out-of-synchronization detection code data sequence into said transmission data sequence; and means for converting said transmission data sequence including said out-of-synchronization detection data sequence to serial data and transmitting the serial data to a transmission line, said receiving station comprising:

conversion means for performing a serial to parallel conversion to convert the serial data received from said transmission station through said transmission line to parallel data;

detection means for processing said transmission data sequence converted to the parallel data on a byte unit basis and determining whether a part of said out-of-synchronization detection code data sequence in said transmission data sequence is detected as said first predetermined code data or not; and recovery means for, when a part of said out-of-synchronization detection code data sequence is detected as said first predetermined code data by said detection means, conducting an operation to recover the processing on a byte unit basis of said transmission data sequence to a synchronized state between said transmission station and said receiving station.

14. A synchronization recovery apparatus according to claim 13, wherein said recovery means include means, responsive to the detection of a part of said out-of-synchronization detection code data sequence as said first predetermined code data by said detection means, for switching the serial to parallel processing of said conversion means from a serial to parallel conversion on a byte unit basis for sequentially shifting the serial data of the received transmission data sequence on a byte unit basis and converting the shifted serial data on a byte unit basis in synchronism with the bit unit of said serial data, to a serial to parallel conversion on a bit unit basis for sequentially shifting the serial data of the received transmission data sequence on a bit unit basis and converting the shifted serial data on a byte unit basis in synchronism with the bit unit of said serial data.

15. A synchronization recovery apparatus according to claim 14, wherein said first predetermined code data is data for triggering the switching of said conversion means from the serial to parallel conversion on a byte unit basis to the serial to parallel conversion on a bit unit basis.

16. A synchronization recovery apparatus according to claim 15, wherein said first predetermined code data is a data representing a last portion of said transmission data sequence.

17. A synchronization recovery apparatus according to claim 13, wherein said recovery means includes means, responsive to the detection of a part of said out-of-synchronization detection code data sequence as said first predetermined code data by said detection means, for switching the serial to parallel processing of said conversion means from a serial to parallel conversion on a byte unit basis for sequentially shifting the serial data of the received transmission data sequence on a bit unit basis and converting the shifted serial data on a byte unit basis in synchronism with the bit unit of said serial data;

means for detecting the second predetermined code data in the next transmission data sequence for conducting the processing of the next transmission data sequence of said transmission data sequence on a byte unit basis, from the parallel data subjected to the serial to parallel conversion on a bit unit basis by said conversion means; and means responsive to the detection of said second predetermined code data of said next transmission data sequence for switching the processing of said conversion means from the serial to parallel conversion on a bit unit basis to the serial to the serial to parallel conversion on a byte unit basis.

18. A synchronization recovery apparatus according to claim 17, wherein said second predetermined code data in said transmission data sequence is code data representing a head portion of said transmission data sequence.

19. A synchronization recovery apparatus according to claim 13, wherein said transmission data sequence is a transmission data sequence conforming to the JPEG Standard and said first predetermined code data is an EOI marker.

20. A synchronization recovery apparatus according to claim 19, wherein said out-of-synchronization detection code data sequence insertion means inserts said out-of-synchronization detection code data sequence into a predetermined marker of a header field of said transmission data sequence.

21. A synchronization recovery apparatus according to claim 20, wherein the predetermined marker of the header field of said transmission data sequence is an APP marker.

22. A synchronization recovery apparatus according to claim 20, wherein the predetermined marker of the header field of said transmission data sequence is a COM marker.

23. A synchronization recovery apparatus according to claim 19, wherein said predetermined number of bits is 7.

* * * * *